US012809187B2

(12) United States Patent
Hayashi

(10) Patent No.: US 12,809,187 B2
(45) Date of Patent: Nov. 24, 2026

(54) LIGHT SOURCE APPARATUS AND IMAGE DISPLAY APPARATUS

(71) Applicant: SONY SEMICONDUCTOR SOLUTIONS CORPORATION, Kanagawa (JP)

(72) Inventor: Kengo Hayashi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 377 days.

(21) Appl. No.: 18/558,562

(22) PCT Filed: Feb. 2, 2022

(86) PCT No.: PCT/JP2022/003923
§ 371 (c)(1),
(2) Date: Nov. 2, 2023

(87) PCT Pub. No.: WO2022/239323
PCT Pub. Date: Nov. 17, 2022

(65) Prior Publication Data
US 2024/0219739 A1 Jul. 4, 2024

(30) Foreign Application Priority Data
May 10, 2021 (JP) ................................ 2021-079713

(51) Int. Cl.
*G02B 27/10* (2006.01)
*G02B 27/12* (2006.01)
*G02B 27/14* (2006.01)

(52) U.S. Cl.
CPC ......... *G02B 27/108* (2013.01); *G02B 27/126* (2013.01); *G02B 27/141* (2013.01)

(58) Field of Classification Search
CPC .. G02B 27/108; G02B 27/10; G02B 27/1006; G02B 27/102
See application file for complete search history.

(56) References Cited

U.S. PATENT DOCUMENTS

2005/0053330 A1* 3/2005 Arakida .................. G02B 6/42 385/129
2018/0035087 A1* 2/2018 Xu ..................... G02B 27/0172
(Continued)

FOREIGN PATENT DOCUMENTS

CN 103869590 A 6/2014
JP 2005-084227 3/2005
(Continued)

OTHER PUBLICATIONS

International Search Report and Written Opinion prepared by the Japan Patent Office on Apr. 19, 2022, for International Application No. PCT/JP2022/003923, 2 pgs.

*Primary Examiner* — Joseph P Martinez
(74) *Attorney, Agent, or Firm* — SHERIDAN ROSS P.C.

(57) ABSTRACT

It is an object of the present invention to provide a light source apparatus and an image display apparatus. A light source apparatus according to the present invention including: a plurality of light source units that respectively emits light in respective colors; a light-combining/splitting unit that combines/splits light emitted from each of the plurality of light source units; at least one light-receiving unit that receives light emitted from the light-combining/splitting unit; and a control unit that switches activation and deactivation of each of the plurality of light source units, in which the control unit stops each of the plurality of light source units on the basis of light received by the light-receiving unit.

20 Claims, 12 Drawing Sheets

(56) References Cited

U.S. PATENT DOCUMENTS

| | | | |
|---|---|---|---|
| 2018/0115755 | A1 | 4/2018 | Xu |
| 2018/0115756 | A1 | 4/2018 | Xu |

FOREIGN PATENT DOCUMENTS

| | | | | | |
|---|---|---|---|---|---|
| JP | 2010044204 | A | | 2/2010 | |
| JP | 2010-107615 | | | 5/2010 | |
| JP | 2011008221 | A | | 1/2011 | |
| JP | 2012-053323 | | | 3/2012 | |
| JP | WO2013/001590 | | * | 1/2013 | ........... H04N 13/365 |
| JP | 2013062769 | A | | 4/2013 | |
| JP | 2015-022251 | | | 2/2015 | |
| JP | 2018-166165 | | | 10/2018 | |
| JP | 2019-056745 | | | 4/2019 | |
| JP | 2019086528 | A | | 6/2019 | |
| WO | WO 2013/001590 | | | 1/2013 | |
| WO | WO-2018061539 | A1 | | 4/2018 | |

* cited by examiner

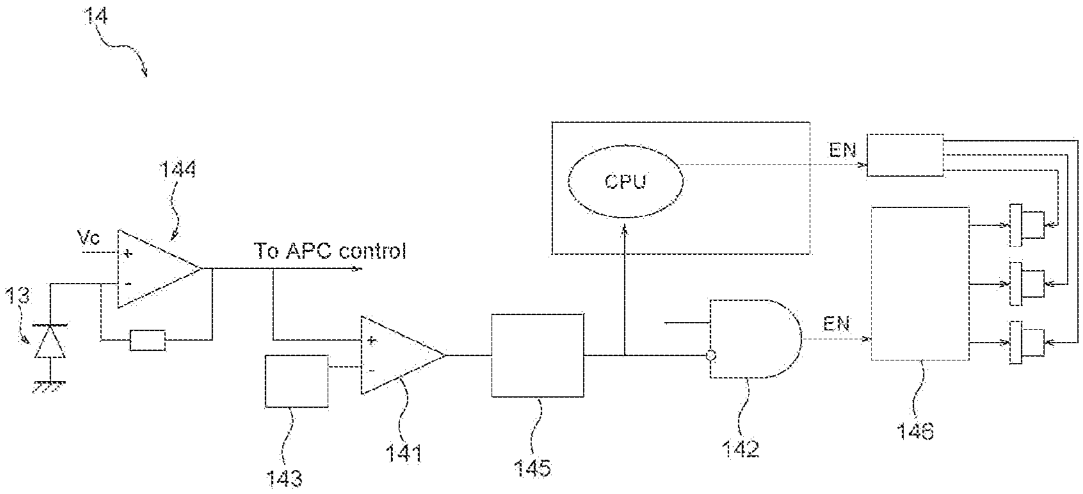

FIG.2

| | Red light | Green light | Blue light |
|---|---|---|---|
| Light amount ratio of light source units 11R,11G,11B | 300 | 200 | 100 |
| Reflectance of mirror 121 | 100% reflected | – | – |
| Transmittance and reflectance of first dichroic mirror 122 | 100% transmitted | 100% reflected | – |
| Transmittance and reflectance of second dichroic mirror 123 | 100% transmitted | 100% transmitted | 100% reflected |
| Transmittance and reflectance of half mirror 125 | 50% transmitted 50% reflected | 50% transmitted 50% reflected | 50% transmitted 50% reflected |
| Light amount ratio on optical path | 150 | 100 | 50 |
| Light amount ratio received by light-receiving unit 13 | 150 | 100 | 50 |
| Output voltage ratio of light-receiving unit 13 | 450 | 200 | 50 |

FIG.3

| | Red light | Green light | Blue light |
|---|---|---|---|
| Light amount ratio of light source units 11R,11G,11B | 300 | 200 | 100 |
| Reflectance of mirror 121 | 100% reflected | – | – |
| Transmittance and reflectance of first dichroic mirror 122 | 100% transmitted | 100% reflected | – |
| Transmittance and reflectance of second dichroic mirror 123 | 100% transmitted | 100% transmitted | 100% reflected |
| Transmittance and reflectance of half mirror 125 | 50% transmitted 50% reflected | 50% transmitted 50% reflected | 50% transmitted 50% reflected |
| Light amount ratio on optical path | 150 | 100 | 50 |
| Transmittance of filter unit 18 | 11% transmitted | 25% transmitted | 100% transmitted |
| Light amount ratio received by light-receiving unit 13 | 17 | 25 | 50 |
| Output voltage ratio of light-receiving unit 13 | 50 | 50 | 50 |

FIG.6

| | Red light | Green light | Blue light |
|---|---|---|---|
| Light amount ratio of light source units 11R,11G,11B | 300 | 200 | 100 |
| Reflectance of mirror 121 | 100% reflected | – | – |
| Transmittance and reflectance of first dichroic mirror 122 | 100% transmitted | 100% reflected | – |
| Transmittance and reflectance of second dichroic mirror 123 | 100% transmitted | 100% transmitted | 100% reflected |
| Transmittance and reflectance of half mirror 125 | 50% transmitted 50% reflected | 50% transmitted 50% reflected | 50% transmitted 50% reflected |
| Light amount ratio on optical path | 150 | 100 | 50 |
| Transmittance of filter unit 18 | 1.1% transmitted | 2.5% transmitted | 100% transmitted |
| Light amount ratio received by light-receiving unit 13 | 1.7 | 2.5 | 50 |
| Output voltage ratio of light-receiving unit 13 | 5 | 5 | 50 |

FIG.7

| | Red light | Green light | Blue light |
|---|---|---|---|
| Light amount ratio of light source units 11R,11G,11B | 300 | 200 | 100 |
| Reflectance of mirror 121 | 56% reflected | – | – |
| Transmittance and reflectance of first dichroic mirror 122 | 100% transmitted | 63% reflected | – |
| Transmittance and reflectance of second dichroic mirror 123 | 100% transmitted | 100% transmitted | 100% reflected |
| Transmittance and reflectance of third dichroic mirror 124 | 90% transmitted 10% reflected | 80% transmitted 20% reflected | 50% transmitted 50% reflected |
| Light amount ratio on optical path | 150 | 100 | 50 |
| Light amount ratio received by light-receiving unit 13 | 17 | 25 | 50 |
| Output voltage ratio of light-receiving unit 13 | 50 | 50 | 50 |

FIG.9

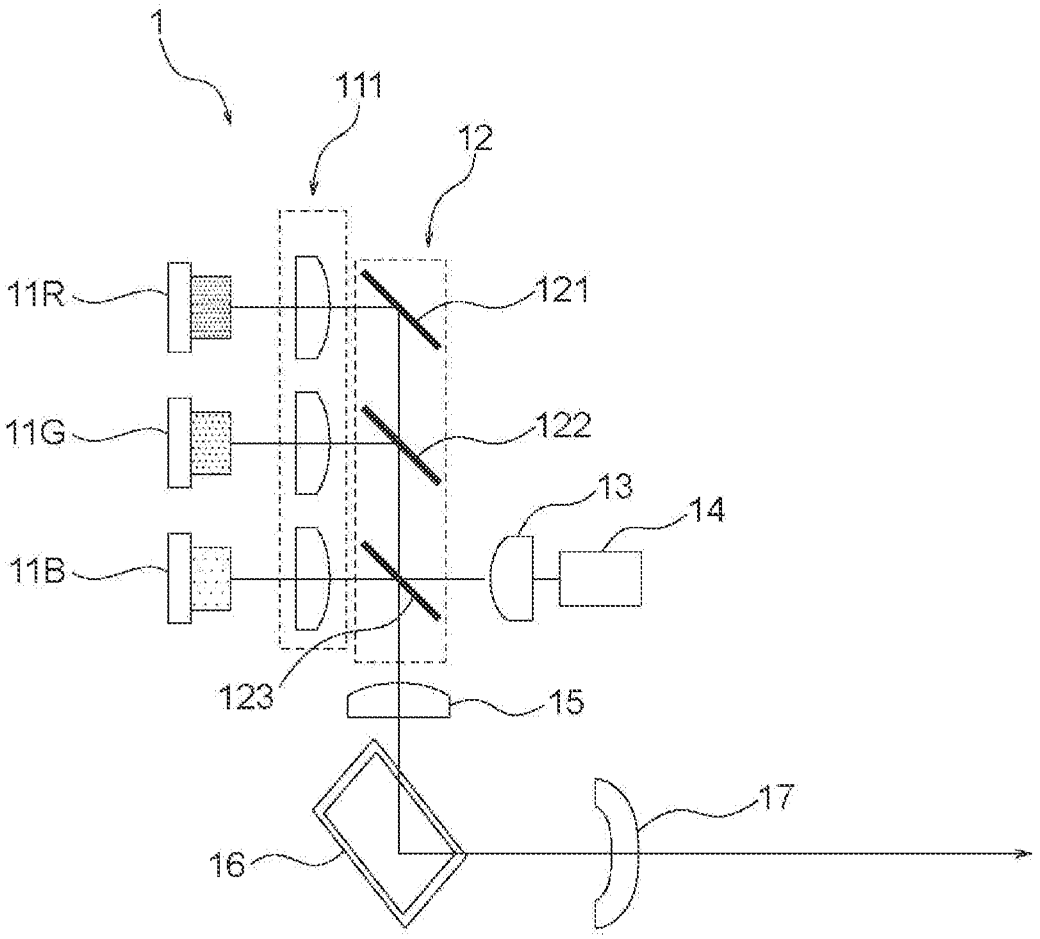

FIG.10

| | Red light | Green light | Blue light |
|---|---|---|---|
| Light amount ratio of light source units 11R,11G,11B | 300 | 200 | 100 |
| Reflectance of mirror 121 | 56% reflected | – | – |
| Transmittance and reflectance of first dichroic mirror 122 | 100% transmitted | 63% reflected | – |
| Transmittance and reflectance of second dichroic mirror 123 | 90% transmitted 10% reflected | 80% transmitted 20% reflected | 50% transmitted 50% reflected |
| Light amount ratio on optical path | 150 | 100 | 50 |
| Light amount ratio received by light-receiving unit 13 | 17 | 25 | 50 |
| Output voltage ratio of light-receiving unit 13 | 50 | 50 | 50 |

FIG.11

| | Red light | Green light | Blue light |
|---|---|---|---|
| Light amount ratio of light source units 11R,11G,11B | 166.7 | 250 | 500 |
| Reflectance of mirror 121 | 100% reflected | – | – |
| Transmittance and reflectance of first dichroic mirror 122 | 100% transmitted | 100% reflected | – |
| Transmittance and reflectance of second dichroic mirror 123 | 100% transmitted | 100% transmitted | 100% reflected |
| Transmittance and reflectance of half mirror 125 | 90% transmitted 10% reflected | 90% transmitted 10% reflected | 90% transmitted 10% reflected |
| Transmittance of filter unit 18 | 100% transmitted | 44.4% transmitted | 11.1% transmitted |
| Light amount ratio on optical path | 150 | 100 | 50 |
| Light amount ratio received by light-receiving unit 13 | 16.7 | 25 | 50 |
| Output voltage ratio of light-receiving unit 13 | 50 | 50 | 50 |

FIG.14

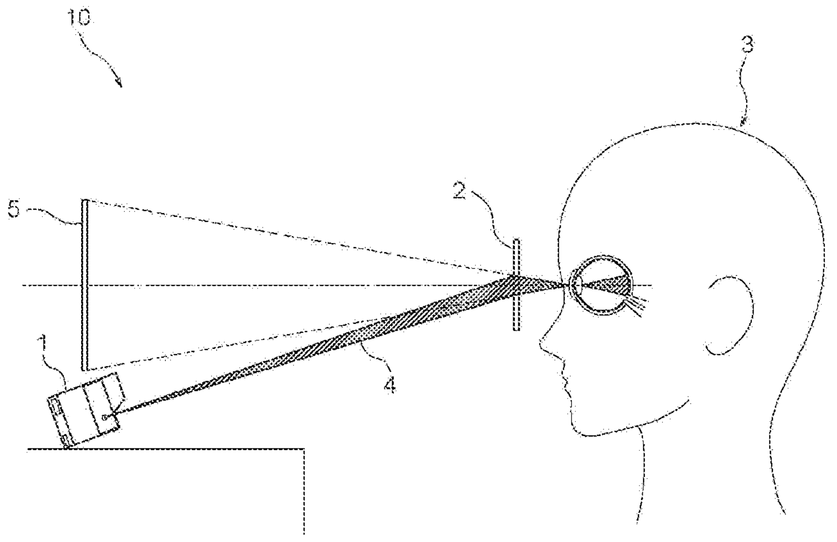

FIG.15

LIGHT SOURCE APPARATUS AND IMAGE DISPLAY APPARATUS

CROSS REFERENCE TO RELATED APPLICATIONS

This application is a national stage application under 35 U.S.C. 371 and claims the benefit of PCT Application No. PCT/JP2022/003923, having an international filing date of 2 Feb. 2022, which designated the United States, which PCT application claimed the benefit of Japanese Patent Application No. 2021-079713, filed 10 May 2021, the entire disclosures of each of which are incorporated herein by reference.

TECHNICAL FIELD

The present technology relates to a light source apparatus and an image display apparatus.

BACKGROUND ART

Conventionally, a projector that emits light, e.g., laser light uses automatic power control (APC) for emitting a stable amount of light.

For example, according to Patent Literature 1, laser light is monitored and the monitoring result is used for the APC. Similarly, for example, according to Patent Literature 2, a result detected by a light detection unit is used for the APC.

Moreover, for example, Patent Literature 3 has disclosed a light intensity attenuation portion attenuating the light intensity of laser light having a short wavelength in order to express white stably.

CITATION LIST

Patent Literature

Patent Literature 1: Japanese Patent Application Laid-open No. 2018-166165

Patent Literature 2: Japanese Patent Application Laid-open No. 2019-056745

Patent Literature 3: Japanese Patent Application Laid-open No. 2015-022251

DISCLOSURE OF INVENTION

Technical Problem

The present technology relates to a technology of projecting video light onto retinas of a user for making the user to visually recognize a video. For the use of the present technology, it is desirable to limit the amount of light to be equal to or lower than a predetermined threshold value so as not to damage the retinas of the user. It is desirable to improve the user's safety by quickly stopping light emission especially in an abnormal case, e.g., in a case where the apparatus malfunctions.

Patent Literatures 1 to 3 have disclosed the technology of emitting a stable amount of light, the technology for stable color expression, and the like. However, they do not sufficiently secure the user's safety for example in an abnormal case.

In view of this, it is a main object of the present technology to provide a light source apparatus and an image display apparatus that improve the safety.

Solution to Problem

The present technology provides a light source apparatus including: a plurality of light source units that respectively emits light in respective colors; a light-combining/splitting unit that combines/splits light emitted from each of the plurality of light source units; at least one light-receiving unit that receives light emitted from the light-combining/splitting unit; and a control unit that switches activation and deactivation of each of the plurality of light source units, in which the control unit stops each of the plurality of light source units on the basis of light received by the light-receiving unit.

The light source apparatus may further include a filter unit that is disposed on an optical path of light emitted from the light-combining/splitting unit and has wavelength dependency.

The filter unit may be disposed on an optical path of light received by the light-receiving unit.

The filter unit may have spectral properties that an amount of light of blue light emitted to the light-receiving unit is larger than an amount of light of each of red light and green light.

The filter unit may be disposed on an optical path toward outside of the light source apparatus.

The filter unit may have spectral properties that an amount of light of blue light emitted is smaller than an amount of light of each of red light and green light.

The light-combining/splitting unit has wavelength dependency.

The light-combining/splitting unit may have spectral properties that an amount of light of blue light emitted to the light-receiving unit is larger than an amount of light of each of red light and green light.

The light-combining/splitting unit may receive laser light.

The light-combining/splitting unit may have an optical waveguide.

The light-combining/splitting unit may have a dichroic mirror.

The light-combining/splitting unit may have a dichroic prism.

The light-receiving unit may have a silicon photodiode.

The control unit may have a comparator that compares a signal value of an analog signal based on an amount of light of light received by the light-receiving unit with a threshold value.

The threshold value may be lower than a signal value of an analog signal based on an amount of light that is an accessible emission limit.

Light on an optical path toward outside of the light source apparatus out of a plurality of optical paths emitted from the light-combining/splitting unit may be projected onto a retina of a user.

In addition, the present technology provides an image display apparatus including: the above-mentioned light source apparatus; and an objective optical unit that receives light emitted from the light source apparatus and emits the light to a retina of a user.

The light source apparatus and the objective optical unit may be separated from each other.

BRIEF DESCRIPTION OF DRAWINGS

FIG. 2 A circuit diagram showing a configuration of a control unit 14 according to the embodiment of the present technology.

FIG. 3 A table showing an example of design according to the embodiment of the present technology.

FIG. 6 A table showing an example of the design according to the embodiment of the present technology.

FIG. 7 A table showing an example of the design according to the embodiment of the present technology.

FIG. 9 A table showing an example of the design according to the embodiment of the present technology.

FIG. 10 A schematic view showing a configuration of the light source apparatus 1 according to the embodiment of the present technology.

FIG. 11 A table showing an example of the design according to the embodiment of the present technology.

FIG. 14 A table showing an example of the design according to the embodiment of the present technology.

FIG. 15 A schematic view showing a configuration of an image display apparatus 10 according to the embodiment of the present technology.

MODE(S) FOR CARRYING OUT THE INVENTION

Hereinafter, favorable modes for carrying out the present technology will be described. Embodiments described below show examples of typical embodiments of the present technology. The scope of the present technology should not be understood narrowly due to these embodiments. A plurality of embodiments may be combined. Moreover, schematic views are not necessarily those precisely depicted.

Descriptions of the present technology will be given in the following order.

1. First Embodiment of Present Technology (Example 1 of Light Source Apparatus)
(1) Overview
(2) Description of Present Embodiment
2. Second Embodiment of Present Technology (Example 2 of Light Source Apparatus)
(1) Overview
(2) Description of Present Embodiment
3. Third Embodiment of Present Technology (Example 3 of Light Source Apparatus)
4. Fourth Embodiment of Present Technology (Example 4 of Light Source Apparatus)
5. Fifth Embodiment of Present Technology (Example 5 of Light Source Apparatus)
6. Sixth Embodiment of Present Technology (Example 6 of Light Source Apparatus)
7. Seventh Embodiment of Present Technology (Image Display Apparatus)

1. First Embodiment of Present Technology (Example 1 of Light Source Apparatus)

[(1) Overview]

The present technology relates to a technology of projecting video light onto retinas of a user for making the user to visually recognize a video. For the use of the present technology, it is desirable to limit the amount of light to be equal to or lower than a predetermined threshold value so as not to damage the retinas of the user. For example, JIS C6802 compatible with IEC60825-1, which is one of IEC standards for defining the safety of laser products, has defined an amount of light that is an accessible emission limit depending on a light emission duration for each light wavelength.

It is natural to emit an amount of light smaller than the amount of light that is the accessible emission limit in a normal case. However, it is necessary to emit an amount of light smaller than the amount of light that is the accessible emission limit, for example, also in an abnormal case, e.g., in a case where the apparatus malfunctions. If an amount of light larger than the amount of light that is the accessible emission limit can be emitted in an abnormal case, it is desirable to quickly stop emission in order to secure the user's safety.

Figure 16:
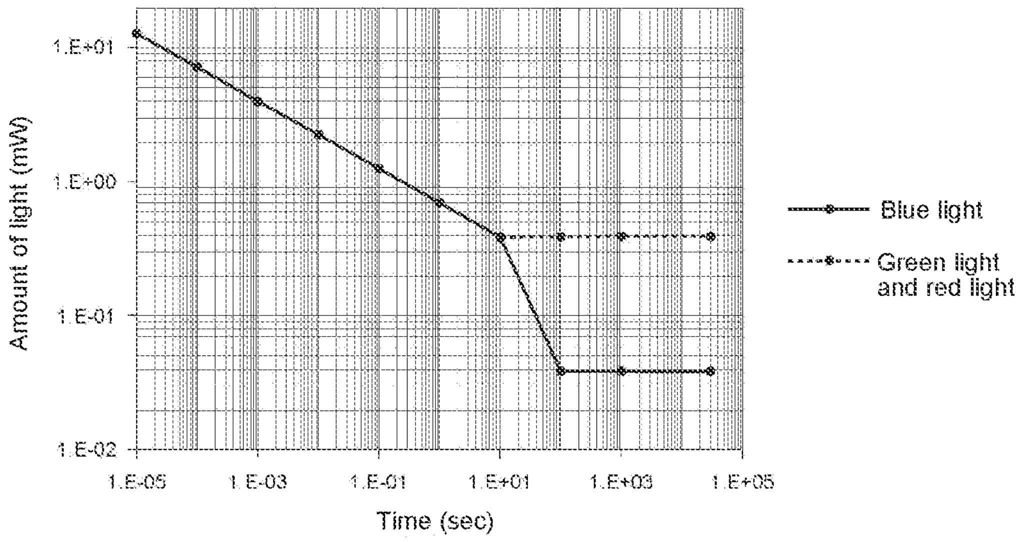
FIG. 16 A graph showing a maximum allowed light exposure amount according to the present technology.

A maximum permissible exposure (MPE) as an amount of light considered less hazardous tends to decrease as the light emission duration increases. It will be described with reference to FIG. 16. FIG. 16 is a graph showing a maximum permissible exposure according to the present technology. In FIG. 16, the horizontal axis denotes the light emission duration and the vertical axis denotes the maximum permissible exposure. As shown in FIG. 16, the maximum permissible exposure decreases as the light emission duration increases.

For example, as to a laser beam scan (LBS) projector with 60 fps, a time required to draw one frame is about 16.7 msec. However, since the light emission duration is about 10 msec when the maximum permissible exposure is 2.2 mW as shown in FIG. 16, the MPE may be exceeded before detection of the amount of light is completed in a case of detecting an amount of light of emitted video light for each frame. Therefore, it is favorable to constantly detect irrespective of whether or not the video light is emitted.

Here, differences between the present technology and prior technologies will be described. Patent Literature 1 has the description, "red laser light, green laser light, and blue laser light are emitted temporally shifted and a light-receiving element monitors it only during a time when the laser light in each color is emitted". It is unnecessary to constantly detect the amount of light for automatic power control (APC) because the amount of light of the laser light changes more gently than the video drawing speed. Moreover, in general, the amount of light is often adjusted by emitting a small amount of light outside a video display region.

However, it is favorable to constantly detect the amount of light as described above in order to detect the amount of light in an abnormal case and the like as described above.

[(2) Description of Present Embodiment]

A light source apparatus according to the embodiment of the present technology is a light source apparatus including: a plurality of light source units that respectively emits light in respective colors; a light-combining/splitting unit that combines/splits light emitted from each of the plurality of light source units; at least one light-receiving unit that receives light emitted from the light-combining/splitting unit; and a control unit that switches activation and deactivation of each of the plurality of light source units, in which the control unit stops each of the plurality of light source units on the basis of light received by the light-receiving unit.

Figure 1:
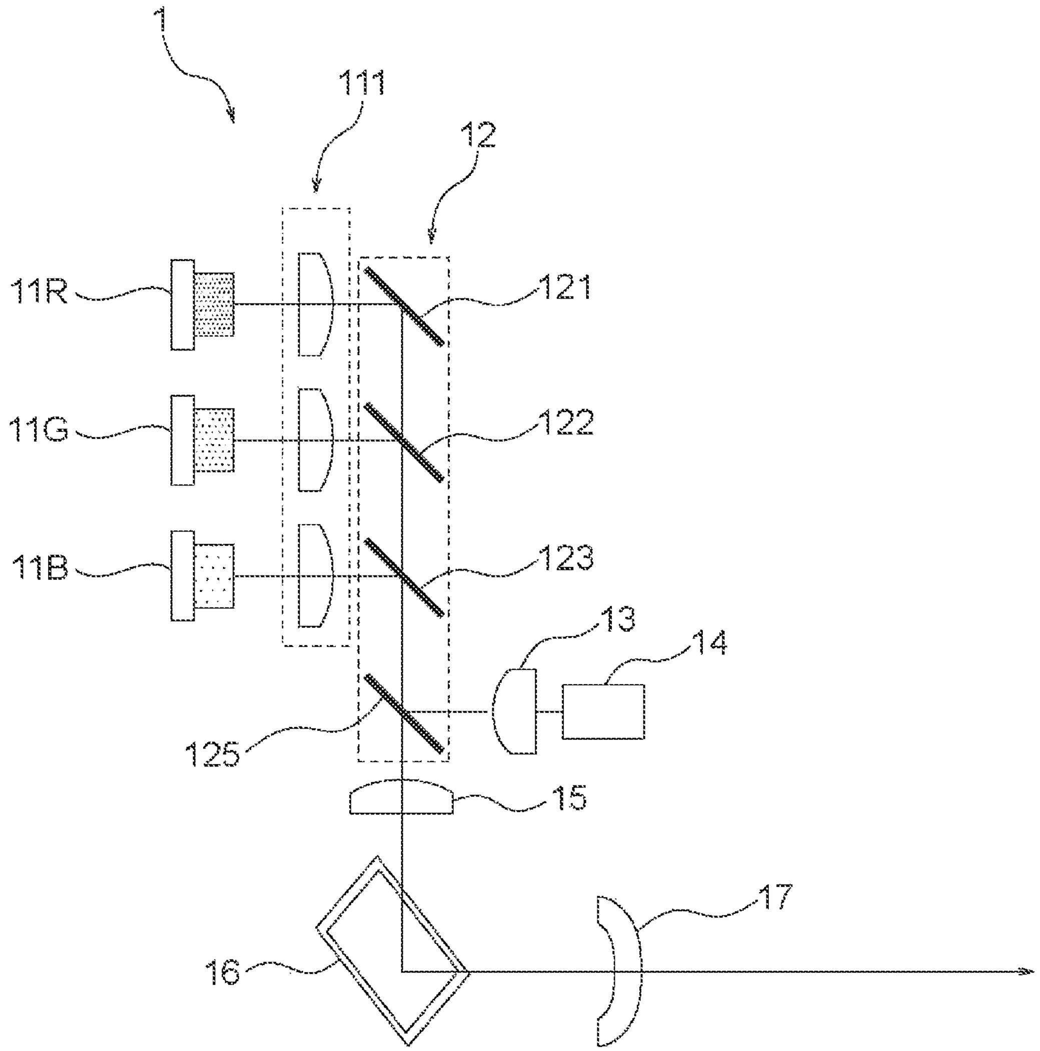
FIG. 1 A schematic view showing a configuration of a light source apparatus 1 according to an embodiment of the present technology.

A configuration of the light source apparatus according to the embodiment of the present technology will be described with reference to FIG. 1. FIG. 1 is a schematic view showing a configuration of a light source apparatus 1 according to the embodiment of the present technology.

As shown in FIG. 1, the light source apparatus 1 according to the embodiment of the present technology includes a plurality of light source units (11R, 11G, 11B) that respectively emits light in respective colors, a light-combining/splitting unit 12 that combines/splits light emitted from each of the plurality of light source units (11R, 11G, 11B), at least one light-receiving unit 13 that receives the light emitted from the light-combining/splitting unit 12, and a control unit 14 that switches activation and deactivation of each of the plurality of light source units (11R, 11G, 11B). The control unit 14 stops each of the plurality of light source units (11R, 11G, 11B) on the basis of the light received by the light-receiving unit 13.

Each of the plurality of light source units (11R, 11G, 11B) emits light in respective colors. For example, the red light source unit 11R emits red light whose wavelength peak is about 640 nm, the green light source unit 11G emits green light whose wavelength peak is about 520 nm, and the blue light source unit 11B emits blue light whose wavelength peak is about 450 nm. Each of the plurality of light source units (11R, 11G, 11B) is supplied with a driving signal from a light source control unit (not shown) and emits video light with predetermined light intensity at a predetermined time in accordance with the video signal.

Each of the plurality of light source units (11R, 11G, 11B) may be a laser light source. The laser technology is not particularly limited. For example, an edge emitting laser may be used or a vertical cavity surface emitting laser (VCSEL) may be used.

For example, a coupling lens 111 can be provided in order to reduce the loss of light emitted from each of the plurality of light source units (11R, 11G, 11B).

The light-combining/splitting unit 12 receives light emitted from each of the plurality of light source units (11R, 11G, 11B). In particular, the light-combining/splitting unit 12 receives laser light.

The light-combining/splitting unit 12 according to the present embodiment has, for example, a mirror that reflects light having all wavelengths, a dichroic mirror that reflects or transmits light in accordance with wavelengths, and a half mirror that splits light. The light-combining/splitting unit 12 has a mirror 121, a first dichroic mirror 122 that transmits the red light and reflects the green light, a second dichroic mirror 123 that transmits the red light and the green light and reflects the blue light, and a half mirror 125.

It should be noted that the configuration of the light-combining/splitting unit 12 is not particularly limited as long as it can combine/split the light emitted from each of the plurality of light source units (11R, 11G, 11B). The same applies to other embodiments to be described later. For example, the light-combining/splitting unit 12 can have an optical waveguide such as an optical fiber. The light-combining/splitting unit 12 may combine the light emitted from each of the plurality of light source units (11R, 11G, 11B) through the optical waveguide. This enables emitted light to be combined even in a case where the plurality of light source units (11R, 11G, 11B) are arranged nearby.

Light on an optical path toward the outside of the light source apparatus 1 out of plurality of optical paths of light emitted from the light-combining/splitting unit 12 may be projected onto the retinas of the user, for example. That is, light on a first optical path out of the plurality of optical paths travels toward the light-receiving unit 13 and light on a second optical path travels toward the outside of the light source apparatus 1. The light on the optical path toward the outside of the light source apparatus 1 may be projected onto the retinas of the user, for example. This enables the user to visually recognize the video. It should be noted that the optical paths of the light emitted from the light-combining/splitting unit 12 are not limited to two.

There is a problem in that deterioration of a focus control function of a crystalline lens serving as a lens causes nearsightedness or farsightedness. However, in the present technology, the user can visually recognize a clear video because the video is directly projected onto the retinas. The video that the user visually recognizes is displayed as a virtual image. For example, the user can visually recognize, focusing on both the virtual image and its background simultaneously.

One of examples of a technique of forming a retinal image of the video can be a Maxwellian view method. The Maxwellian view method is a technique of forming a retinal image by converging video light on the pupil center.

A condenser lens 15 concentrates the light on the second optical path. A light scanning unit 16, e.g., a micro electro mechanical system (MEMS) mirror, modulates the concentrated light. The modulated light is projected onto the user via a projection lens 17.

The video light that the light source apparatus 1 projects onto the user may be coherent light or does not need to be ideal coherent light. The video light may be laser light, for example. The laser light has properties that it is extremely close to coherent light and light beams are parallel and hardly spread. For example, using a semiconductor laser (laser diode (LD)) as the light source unit (11R, 11G, 11B) can achieve this.

For example, a light emission diode (LED) may be used as the light source unit (11R, 11G, 11B) in accordance with a favorable implementation of the present technology.

The light source apparatus 1 may project different video light onto the right and left eyes of the user in accordance with a favorable implementation of the present technology. For example, on the basis of a parallax between the right and left eyes of the user, the light source apparatus 1 may project different video light onto the right and left eyes. Accordingly, for example, the user can recognize a three-dimensional position of a presented video with the right and left eyes, for example. For example, in an external landscape that the user is viewing, a three-dimensional virtual image seems to float up.

The light scanning unit 16 is capable of moving the direction of the video light output from the light source unit at high speed so that a video is formed on the retinas. To be more specific, the light scanning unit 16 is capable of displaying a two-dimensional image by changing the color of incident video light on a dot-by-dot basis while changing the angle on a dot-by-dot basis, for example.

The light scanning unit 16 may include a scanning element that is driven horizontally and vertically. Alternatively, the light scanning unit 16 may include a horizontally-driven scanning element and a vertically-driven scanning element.

For example, a digital micromirror device may be used as the light scanning unit 16 other than the MEMS mirror.

The light-receiving unit 13 detects the amount of light on the first optical path so as to prevent the amount of light on the second optical path from exceeding the amount of light that is the accessible emission limit. Then, in a case where the amount of light that is the accessible emission limit may be exceeded, the control unit 14 electrically connected to the light-receiving unit 13 stops each of the plurality of light source units (11R, 11G, 11B). Although it is not shown in the figure, the control unit 14 is electrically connected to each of the plurality of light source units (11R, 11G, 11B).

It should be noted that the present embodiment is merely exemplary and, for example, the number of light source units, the number of mirrors of the light-combining/splitting unit 12, and the positions where the components are arranged are not limited.

The light-receiving unit 13 outputs an analog signal corresponding to an amount of light of received light. As for an example of the light-receiving unit 13, a photodiode or the like that converts received light energy into electric energy can be used. In particular, the light-receiving unit 13 can have a silicon photodiode. This enables the light-receiving unit 13 to have suitable sensitivity to light having a wavelength of each of the red light, the green light, and the blue light. The sensitivity refers to a ratio of an amount of light received by the light-receiving unit 13 to an amount of electric energy output from the light-receiving unit 13.

The light-receiving unit 13 is arranged at a position to which light combined by the light-combining/splitting unit 12 is emitted. This enables the single light-receiving unit 13 to detect an amount of light of each of the red light, the green light, and the blue light.

The control unit 14 stops each of the plurality of light source units (11R, 11G, 11B) on the basis of the light received by the light-receiving unit 13. In particular, the control unit 14 stops each of the plurality of light source units (11R, 11G, 11B) in a case where the signal value of the analog signal output from the light-receiving unit 13 has exceeded a predetermined threshold value. This enables the amount of light exceeding the accessible emission limit from being projected onto the retinas of the user.

The control unit 14 can be constituted by a circuit, for example. A configuration of the control unit 14 will be described with reference to FIG. 2. FIG. 2 is a circuit diagram showing a configuration of the control unit 14 according to the embodiment of the present technology.

As shown in FIG. 2, the control unit 14 has a comparator 141. The comparator 141 compares the signal value of the analog signal based on the amount of light of the light received by the light-receiving unit 13 with a threshold value.

The threshold value is stored in a storage unit 143. For example, a flash memory is used for the storage unit 143. The threshold value stored in the storage unit 143 can be converted into an analog signal via a DA converter (not shown), for example, and input to the comparator 141.

In addition, the control unit 14 can have a voltage converting unit 144 that converts a current value into a voltage value and a retaining unit 145 that retains a signal value. For example, a transimpedance amplifier can be used for the voltage converting unit 144. For example, a flip-flop can be used for the retaining unit 145.

An operation of the control unit 14 will be described. A current value that is the analog signal output from the light-receiving unit 13 is input to the voltage converting unit 144. The voltage converting unit 144 converts the input current value into a voltage value. The gain of the voltage converting unit 144 may be set to be optimal on the basis of, for example, the amount of light of the light received by the light-receiving unit 13 and a voltage value that can be output without saturation. The voltage value is input to the comparator 141. It should be noted that the voltage value output from the voltage converting unit 144 can also be used for the APC.

The comparator 141 compares a voltage value that is the signal value of the analog signal output from the voltage converting unit 144 with the threshold value. The threshold value is favorably lower than a signal value of an analog signal based on the amount of light that is the accessible emission limit. This enables the amount of light exceeding the accessible emission limit from being projected onto the retinas of the user.

In addition, such a threshold value is favorably higher than the signal value of the analog signal based on the amount of light in a normal case. The normal case is an antonym of the abnormal case. The abnormal case refers to a case where an unexpected amount of light is emitted for example in a case where the apparatus malfunctions. That is, the normal case refers to an amount of light within a designed range for the apparatus is emitted. Stop of each of the plurality of light source units (11R, 11G, 11B) in the normal case can be prevented based on the fact that such a threshold value is higher than the signal value of the analog signal based on the amount of light in the normal case.

The comparator 141 shifts an output signal value from low to high for example in a case where the voltage value output from the voltage converting unit 144 has exceeded the threshold value. This allows detection of a possibility that the amount of light exceeding the accessible emission limit can be emitted.

The retaining unit 145 retains the signal value output from the comparator 141. This can prevent shift from high to low immediately after the output signal of the comparator 141 shifts from low to high, for example. Therefore, each of the plurality of light source units (11R, 11G, 11B) can be reliably stopped.

The control unit 14 can further include a logic gate 142. The logic gate 142 receives a signal output from the comparator 141 and a signal for controlling the operation of each of the plurality of light source units (11R, 11G, 11B). The logic gate 142, may be an AND gate, for example. The logic gate 142 receives the signal output from the comparator 141 and the signal for controlling the operation of each of the plurality of light source units (11R, 11G, 11B). The logic gate 142 outputs a low-value signal when the value of either one of the signals is low.

Accordingly, the signal output from the comparator 141 and the signal for controlling the operation of each of the plurality of light source units (11R, 11G, 11B) in the normal case can separately control the light source unit (11R, 11G, 11B). As a result, the signal output from the comparator 141 (signal indicating the abnormal case) does not affect the signal used in the normal case.

This output signal is input to a light source control unit 146 such as a laser driver as an enable signal (EN signal). The light source control unit 146 stops each of the plurality of light source units (11R, 11G, 11B) by shift of the EN signal from high to low, for example.

The signal output from the comparator 141 can be input to a central processing unit (CPU) in addition to the logic gate 142. This can stop a power supply for the entire apparatus including a power supply for the light source unit. Software can perform processing subsequent to the CPU and hardware can perform other processing. The software tends to perform processing slower than the hardware. Therefore, first of all, each of the plurality of light source units (11R, 11G, 11B) can be stopped, and then the entire apparatus can be stopped.

It should be noted that this circuit is exemplary, and the embodiment of the control unit 14 is not limited thereto. This circuit may include a filter circuit that removes noise, for example.

An example of the design of the present embodiment will be described with reference to FIG. 3. FIG. 3 is a table showing an example of the design according to the embodiment of the present technology. It should be noted that for the sake of brief description, it is assumed that optical elements not found in this table cause no light loss. The same applies to the following embodiments.

As shown in FIG. 3, the ratio of the amounts of light of the red light, the green light, and the blue light respectively emitted by the plurality of light source units (11R, 11G, 11B) is 300:200:100.

The mirror 121 of the light-combining/splitting unit 12 is disposed on the optical path of the red light emitted from the red light source unit 11R and reflects 100% of the red light.

The first dichroic mirror 122 of the light-combining/splitting unit 12 is disposed on the optical path of the red light emitted from the mirror 121 and on the optical path of the green light emitted from the green light source unit 11G. The first dichroic mirror 122 transmits 100% of the red light and reflects 100% of the green light. Accordingly, the red light and the green light are combined.

The second dichroic mirror 123 of the light-combining/splitting unit 12 is disposed on the optical paths of the red light and the green light emitted from the first dichroic mirror 122 and on the optical path of the blue light emitted from the blue light source unit 11B. The second dichroic mirror 123 transmits 100% of the red light and 100% of the green light and reflects 100% of the blue light. Accordingly, the red light, the green light, and the blue light are combined.

The half mirror 125 of the light-combining/splitting unit 12 is disposed on the optical path of the light emitted from the second dichroic mirror 123 and transmits 50% of incident light and reflects 50% of incident light. This enables the half mirror 125 to split incident light into the first optical path toward the light-receiving unit 13 and the second optical path toward the outside (eyes of the user) of the light source apparatus 1. The half mirror 125 can be manufactured at lower cost than a complex light splitting element.

It should be noted that adjusting the transmittance and reflectance of each of the plurality of mirrors of the light-combining/splitting unit 12 may attenuate the amount of light on the second optical path. The same applies to other embodiments to be described later. This makes a neutral density (ND) filter unnecessary. Therefore, the components of the apparatus can be reduced, and it can contribute to reduction in size and cost of the apparatus, for example.

In a case where the light source unit (11R, 11G, 11B) and the light-combining/splitting unit 12 are designed as described above, the ratio of the amounts of light of the red light, the green light, and the blue light included in the second optical path emitted from the light-combining/splitting unit 12 is 150:100:50. Moreover, the ratio of the amounts of light of the red light, the green light, and the blue light included in the first optical path emitted from the light-combining/splitting unit 12 and received by the light-receiving unit 13 is also 150:100:50.

Here, in order to simplifying the description, the ratio of the sensitivity of the red light, the green light, and the blue light that the light-receiving unit 13 has is assumed to be 3:2:1. The same applies to the following embodiments. At this time, the ratio of the voltage output from the light-receiving unit 13 when receiving the red light, the green light, and the blue light is 450:200:50.

It should be noted that the light-receiving unit 13 may be used for, for example, the APC, not for stopping each of the plurality of light source units (11R, 11G, 11B). Here, the APC will be briefly described. A projector having laser as its light source uses the APC for emitting a stable amount of light. As in the present embodiment, in a case where the single light-receiving unit 13 detects the amount of light, the APC may be performed on the basis of the amount of light of each of the red light, the green light, and the blue light by shifting a time when for example, each of the red light, the green light, and the blue light is made incident on the light-receiving unit 13. As an example of the time shifting means, each of the red light, the green light, and the blue light may be individually emitted in one frame in the video. Alternatively, as an example of the time shifting means, the red light may be emitted in one frame of three frames of the video, the green light may be emitted in the next one frame, and the blue light may be emitted in the next one frame.

Alternatively, a single light-receiving unit for detecting the amount of light that is the accessible emission limit and a single light-receiving unit for the APC may be arranged.

2. Second Embodiment of Present Technology (Example 2 of Light Source Apparatus)

[(1) Overview]

The amount of light that is the accessible emission limit defined in JIS C6802, and when the light emission duration is 8 hours, for example, as shown in FIG. 16, the maximum permissible exposure for the red light whose wavelength peak is about 640 nm and the green light whose wavelength peak is about 520 nm is 0.39 mW.

On the other hand, the maximum permissible exposure for the blue light whose wavelength peak is about 450 nm is 0.039 mW. The blue light has a criterion ten times as strict as the criteria of the red light and the green light. It is because the retinas may be damaged by the photochemical action because light whose wavelength is about 500 nm or less exhibits ultraviolet properties.

By the way, the ratio of the amounts of light of the red light, the green light, and the blue light included in the video light when the user recognizes a white color depends on a set color temperature. For example, when the values of the coordinates [x, y] in a color space of CIE1931 are [0.32, 0.33], the ratio of the amounts of light of the red light, the green light, and the blue light is 1:1.7:2.8. That is, it is general that the amount of light of the green light is smaller than that of the red light and the amount of light of the blue light is smaller than that of the green light.

Moreover, as to a light-receiving element such as a photodiode that converts received light energy into electric energy, it is general that the electric energy of the green light is lower than that of the red light and the electric energy of the blue light is smaller than that of the green light in a case where the red light, the green light, and the blue light have the same amount of light.

Conventionally, it is desirable to reduce the components of the apparatus for the purpose of reduction in size and cost of the apparatus. In a configuration in which the light-receiving element detects the amount of light so as to prevent it from exceeding the amount of light that is the accessible emission limit, the number of such light-receiving elements is favorably smaller. In addition, such a light-receiving element is favorably single.

However, it is general that the amount of light of the green light is smaller than that of the red light and the amount of light of the blue light is smaller than that of the green light as described above, and it is also general that as to the electric energy output from the light-receiving element for photoelectric conversion, the electric energy of the green light is lower than that of the red light and the electric energy of the blue light is smaller than that of the green light.

Therefore, in the configuration in which the single light-receiving element is provided, it is difficult to set a threshold value corresponding to the accessible emission limit with respect to each of the red light, the green light, and the blue light. Therefore, it is necessary to control the amount of light by balancing the amounts of light of the red light, the green light, and the blue light while the amount of light of the blue light is smaller than the accessible emission limit. If the amount of light of the blue light may be larger than the amount of light that is the accessible emission limit, it is necessary to reduce the amount of light of each of the red light, the green light, and the blue light in order to balance the amounts of light. Reducing the amount of light of each of the red light, the green light, and the blue light lowers the contrast. Therefore, a problem in that the range of expression of the video may be narrowed arises.

Here, differences between the present technology and prior technologies will be described. Patent Literature 1 to 3 have disclosed the technology of emitting a stable amount of light, the technology for stable color expression, and the like. However, they do not sufficiently secure the user's safety for example in an abnormal case.

In a case where the single light-receiving element that detects the amount of light is provided for the purpose of reduction in size and cost of the apparatus and the like, in general, the electric energy of the green light is lower than that of the red light and the electric energy of the blue light is smaller than that of the green light as described above. Therefore, although no problem arises in a case where the entire video to be displayed is nearly white, an amount of light that is several times as large as the threshold value for determining an abnormality is emitted for example in a case where the entire video is nearly blue.

Figure 17:
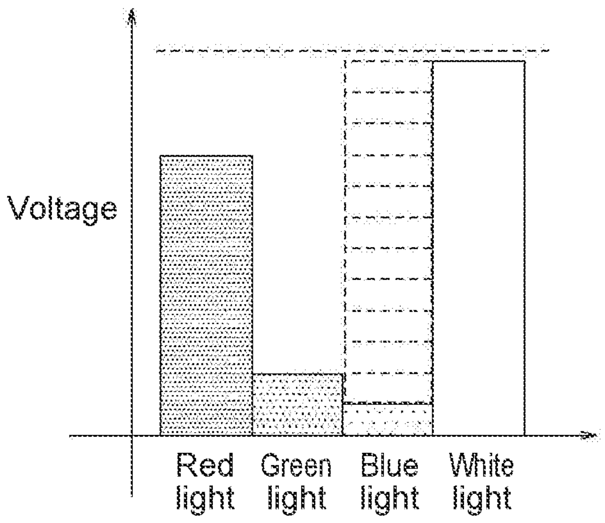
FIG. 17 A diagram describing properties of a light-receiving element.

It will be described with reference to FIG. 17. FIG. 17 is a diagram describing properties of the light-receiving element. As shown in FIG. 17, when an electric energy ratio of the red light, the green light, and the blue light output from the light-receiving element is 9:2:1, white light obtained by mixing these colors is 12 times as much as the blue light. Therefore, in a case where the threshold value for determining an abnormality is set to be slightly larger than this amount of light of white light and the entire video is nearly blue, the abnormality cannot be detected unless the amount of light is about 12 times as large as it. Therefore, an amount of light larger than the amount of light that is the accessible emission limit may be projected onto the retinas. In order to secure the safety, light can be emitted at most only about 0.003 mW that is 1/12 of 0.039 mW as the amount of light that is the accessible emission limit of the blue light. It is necessary to also reduce the amounts of light of the red light and the green light for reducing the amount of light of the blue light.

Therefore, the light source apparatus favorably includes a component having wavelength dependency. For example, the light source apparatus favorably includes a component that makes the electric energy of the blue light output from the light-receiving element for photoelectric conversion larger than the electric energy of each of the red light and the green light. Patent Literatures 1 and 2 have not described this point.

Although Patent Literature 3 has disclosed a light intensity attenuation portion having wavelength dependency, it has an aim obviously different from that of the present technology.

Patent Literature 3 has described that white balance adjustment can be stably executed due to the provision of the light intensity attenuation portion having wavelength dependency. The technology according to Patent Literature 3 has wavelength dependency with respect to video light projected onto the retinas of the user.

On the other hand, the present technology has wavelength dependency with respect to light not projected onto the retinas of the user. The present technology includes a component having wavelength dependency for improving the safety. The present technology has different usage and functions from those of the technology according to Patent Literature 3. It is difficult to conceive the present technology from the technology according to Patent Literature 3.

In addition, in Patent Literature 3, the number of light-receiving elements is not particularly limited. Patent Literature 3 has not described a configuration that quickly stops light emission. Patent Literature 3 has not disclosed any safety improvement.

[(2) Description of Present Embodiment]

Figure 4:
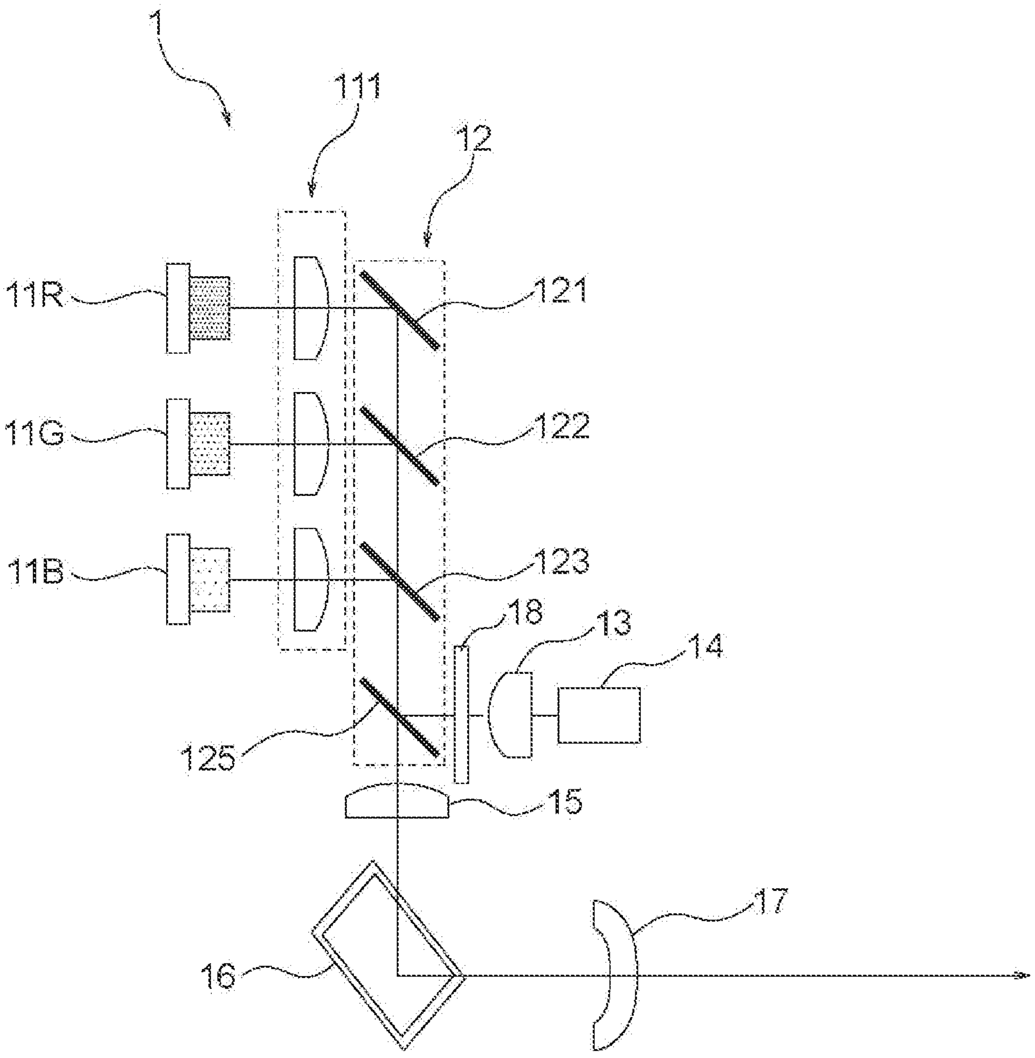
FIG. 4 A schematic view showing a configuration of the light source apparatus 1 according to the embodiment of the present technology.

The light source apparatus according to the embodiment of the present technology may further include a filter unit having wavelength dependency disposed on the optical path of light emitted from the light-combining/splitting unit. It will be described with reference to FIG. 4. FIG. 4 is a schematic view showing a configuration of the light source apparatus 1 according to the embodiment of the present technology.

As shown in FIG. 4, the light source apparatus 1 according to the embodiment of the present technology can further include a filter unit 18. The filter unit 18 is disposed on an optical path of the light emitted from the light-combining/splitting unit 12 and has wavelength dependency. In the present embodiment, the filter unit 18 is disposed on the optical path of the light emitted from the light-combining/splitting unit 12 and received by the light-receiving unit 13. For example, the filter unit 18 may have spectral properties that the amount of light of the blue light emitted to the light-receiving unit 13 is larger than an amount of light of each of the red light and the green light. For example, a filter having transmittance different depending on a wavelength can be used as the filter unit 18.

Accordingly, the light source apparatus 1 can emit video light with a sufficiently large amount of light to the user without exceeding the amount of light that is the accessible emission limit.

Moreover, the filter unit 18 may be disposed on an optical path different from the optical path toward the outside (the eyes of the user) of the light source apparatus 1. Accordingly, the light source apparatus 1 can prevent a change in color balance and can provide a high-quality video to the user.

Figure 5:
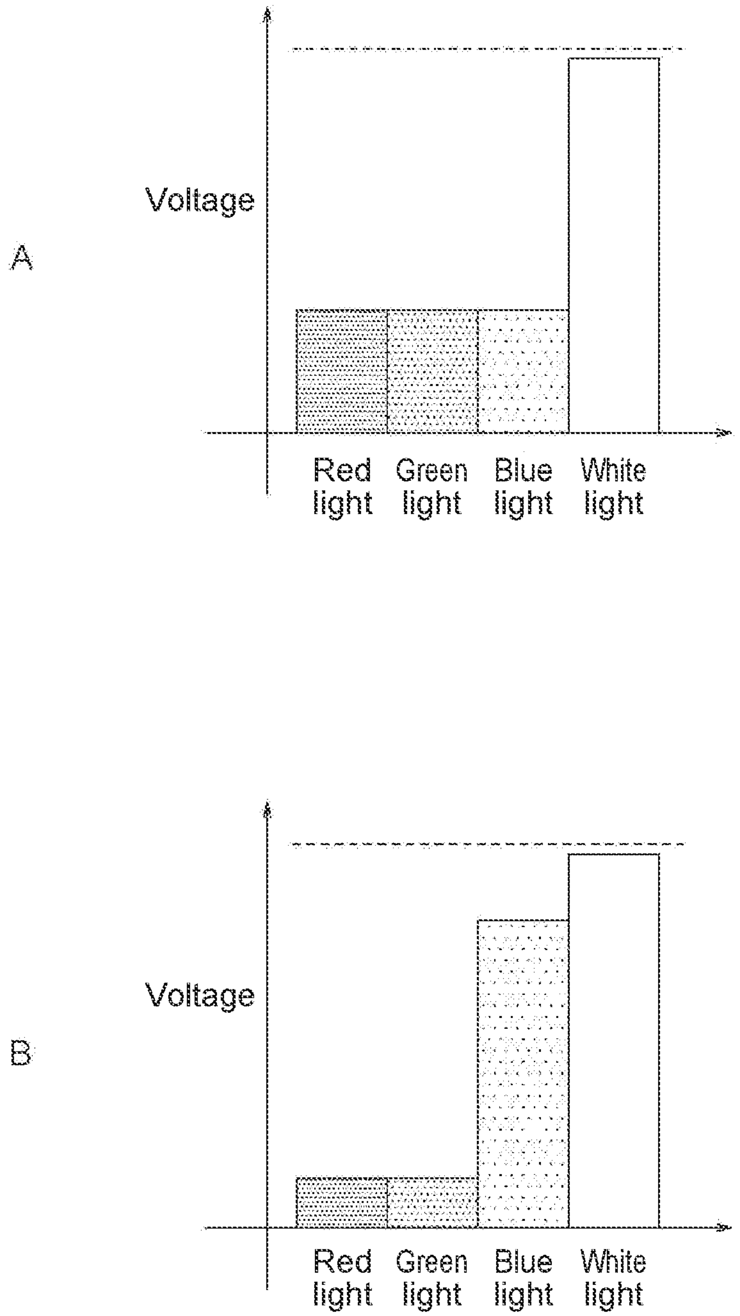
FIG. 5 A diagram for describing properties of a filter unit 18 according to the embodiment of the present technology.

Effects of the filter unit 18 will be described with reference to FIG. 5. FIG. 5 is a diagram for describing properties of a filter unit 18 according to the embodiment of the present technology. FIG. 5 shows voltage values output from the light-receiving unit 13, which depends on the amount of light of the light emitted from the filter unit 18.

A of FIG. 5 shows that the voltage values output in accordance with the red light, the green light, and the blue light are substantially identical owing to the use of the filter unit having wavelength dependency 18.

Accordingly, a problem in that the amount of light of the green light is smaller than that of the red light and the amount of light of the blue light is smaller than that of the green light was solved. In addition, regarding the electric energy output from the light-receiving unit 13, the problem in that the electric energy of the green light is lower than that of the red light and the electric energy of the blue light is smaller than that of the green light was solved.

B of FIG. 5 shows that the voltage value output in accordance with the blue light is about ten times as high as the voltage value output in accordance with each of the red light and the green light owing to the use of the filter unit having wavelength dependency 18.

Accordingly, the problem in that the criterion for the blue light is ten times as strict as the criteria for the red light and the green light in JIS C6802 was solved in addition to the above-mentioned problem.

In accordance with the present technology, a common threshold value corresponding to the accessible emission limit can be set with respect to each of the red light, the green light, and the blue light even if only one light-receiving unit 13 is provided as in the present embodiment.

An example of the design of the present embodiment will be described with reference to FIG. 6. FIG. 6 is a table showing an example of the design according to the embodiment of the present technology. In FIG. 6, the ratio of the amounts of light emitted from the plurality of light source units (11R, 11G, 11B) to the ratio of amounts of light on the second optical path emitted from the light-combining/splitting unit 12 are the same as in FIG. 3.

The filter unit 18 transmits 11% of the red light made incident thereon, transmits 25% of the green light made incident thereon, and transmits 100% of the blue light made incident thereon. The amount of light of the blue light emitted to the light-receiving unit 13 is larger than the amount of light of each of the red light and the green light.

At this time, the ratio of the amounts of light of the red light, the green light, and the blue light received by the light-receiving unit 13 is 17:25:50. When the ratio of the sensitivity of the red light, the green light, and the blue light that the light-receiving unit 13 has is 3:2:1, the ratio of the voltage output from the light-receiving unit 13 when receiving the red light, the green light, and the blue light is 50:50:50.The voltage values output in accordance with the red light, the green light, and the blue light are substantially identical.

Conventionally, as shown in FIG. 17, there were variations among the voltage value output in accordance with the red light, the green light, and the blue light. Therefore, an abnormality was able to be detected only when the amount of light of the blue light is about 12 times as large as that shown in the figure. On the other hand, in accordance with the present technology, as shown in A of FIG. 5, an abnormality can be detected as long as the amount of light of the blue light is about three times as large as that shown in the figure without reducing the amount of light emitted to the user.

Moreover, the filter unit 18 may be designed as shown in FIG. 7. FIG. 7 is a table showing an example of the design according to the embodiment of the present technology. In FIG. 7, the ratio of the amounts of light emitted from the plurality of light source units (11R, 11G, 11B) to the ratio of amounts of light on the second optical path emitted from the light-combining/splitting unit 12 are the same as in FIG. 6.

The filter unit 18 transmits 1.1% of the red light made incident thereon, transmits 2.5% of the green light made incident thereon, and transmits 100% of the blue light made incident thereon. The amount of light of the blue light emitted to the light-receiving unit 13 is larger than the amount of light of each of the red light and the green light.

At this time, the ratio of the amounts of light of the red light, the green light, and the blue light received by the light-receiving unit 13 is 1.7:2.5:50. When the ratio of the sensitivity of the red light, the green light, and the blue light that the light-receiving unit 13 has is 3:2:1, the ratio of the voltage output from the light-receiving unit 13 when receiving the red light, the green light, and the blue light is 5:5:50. The voltage value output in accordance with the blue light is about ten times as high as the voltage value output in accordance with each of the red light and the green light. It should be noted that the voltage value output in accordance with the blue light does not need to be about ten times as high as the voltage value output in accordance with each of the red light and the green light. The ratio of the amounts of light transmitted by the filter unit 18 may be designed as appropriate in accordance with the amount of light emitted to the user, the amount of light that is the accessible emission limit, and the like.

In accordance with the present technology, a hazard to human bodies and, in particular, a high abnormality of the blue light can be detected earlier.

3. Third Embodiment of Present Technology (Example 3 of Light Source Apparatus)

Figure 8:
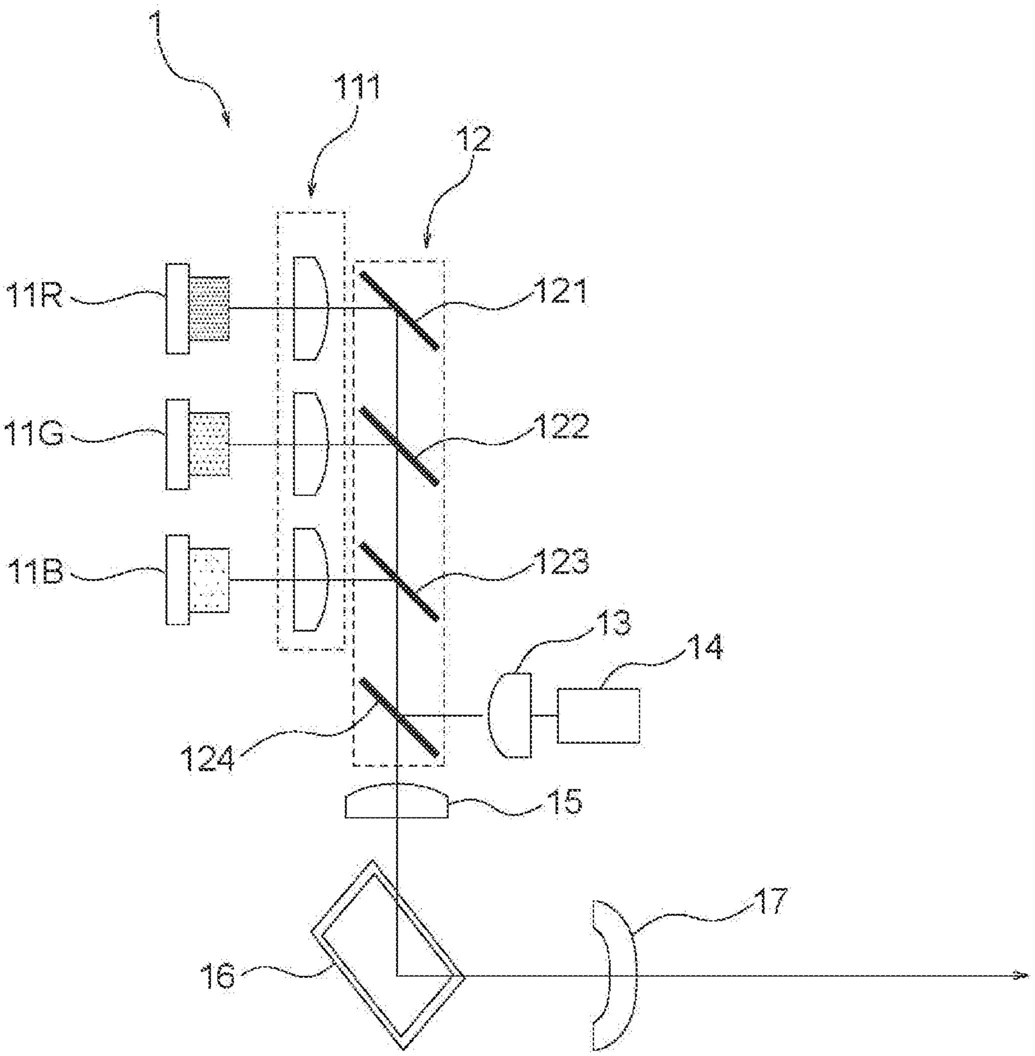
FIG. 8 A schematic view showing a configuration of the light source apparatus 1 according to the embodiment of the present technology.

In a light source apparatus according to an embodiment of the present technology, a light-combining/splitting unit may have wavelength dependency. It will be described with reference to FIG. 8. FIG. 8 is a schematic view showing a configuration of a light source apparatus 1 according to the embodiment of the present technology.

As shown in FIG. 8, the light-combining/splitting unit 12 according to the embodiment of the present technology has a mirror 121, a first dichroic mirror 122 that transmits the red light and reflects the green light, a second dichroic mirror 123 that transmits the red light and the green light and reflects the blue light, and a third dichroic mirror 124 that transmits and reflects light in accordance with a light wavelength.

The light-combining/splitting unit 12 has wavelength dependency. That is, the mirror 121, the first dichroic mirror 122, the second dichroic mirror 123, and/or the third dichroic mirror 124 of the light-combining/splitting unit 12 have wavelength dependency.

This wavelength dependency may be similar to the wavelength dependency of the filter unit 18 in the second embodiment. That is, the light-combining/splitting unit 12 has spectral properties that the amount of light of the blue light emitted to the light-receiving unit 13 is larger than the amount of light of each of the red light and the green light.

Accordingly, the light source apparatus 1 can emit video light with a sufficiently large amount of light to the user without exceeding the amount of light that is the accessible emission limit even without providing the filter unit 18 as in the second embodiment. Moreover, the number of components is reduced. Therefore, the present technology can contribute to reduction in size and manufacturing cost of the apparatus, for example.

An example of the design of the present embodiment will be described with reference to FIG. 9. FIG. 9 is a table showing an example of the design according to the embodiment of the present technology.

As shown in FIG. 9, the ratio of the amounts of light of the red light, the green light, and the blue light respectively emitted by the plurality of light source units (11R, 11G, 11B) is 300:200:100.

The mirror 121 of the light-combining/splitting unit 12 is disposed on the optical path of the red light emitted from the red light source unit 11R and reflects 56% of the red light.

The first dichroic mirror 122 of the light-combining/splitting unit 12 is disposed on the optical path of the red light emitted from the mirror 121 and on the optical path of the green light emitted from the green light source unit 11G. The first dichroic mirror 122 transmits 100% of the red light and reflects 63% of the green light. Accordingly, the red light and the green light are combined.

The second dichroic mirror 123 of the light-combining/splitting unit 12 is disposed on the optical paths of the red light and the green light emitted from the first dichroic mirror 122 and on the optical path of the blue light emitted from the blue light source unit 11B. The second dichroic mirror 123 transmits 100% of the red light and 100% of the green light and reflects 100% of the blue light. Accordingly, the red light, the green light, and the blue light are combined.

The third dichroic mirror 124 of the light-combining/splitting unit 12 is disposed on the optical path of the light emitted from the second dichroic mirror 123. The third dichroic mirror 124 transmits 90% of the red light made incident thereon and reflects 10% of the red light made incident thereon. The third dichroic mirror 124 transmits 80% of the green light made incident thereon and reflects 20% of the green light made incident thereon. The third dichroic mirror 124 transmits 50% of the blue light made incident thereon and reflects 50% of the blue light made incident thereon. Accordingly, the third dichroic mirror 124 can split incident light into the first optical path toward the light-receiving unit 13 and the second optical path toward the outside (eyes of the user) of the light source apparatus 1.

In a case where the light source unit (11R, 11G, 11B) and the light-combining/splitting unit 12 are designed as described above, the ratio of the amounts of light of the red light, the green light, and the blue light included in the second optical path emitted from the light-combining/splitting unit 12 is 150:100:50. On the other hand, the ratio of the amounts of light of the red light, the green light, and the blue light included in the first optical path emitted from the light-combining/splitting unit 12 and received by the light-receiving unit 13 is 17:25:50. At this time, the ratio of the voltage output from the light-receiving unit 13 when receiving the red light, the green light, and the blue light is 50:50:50. The voltage values output in accordance with the red light, the green light, and the blue light are substantially identical.

It should be noted that as in FIG. 7, the ratio of the amounts of light of the red light, the green light, and the blue light received by the light-receiving unit 13 may be designed to be 1.7:2.5:50. The same applies to other embodiments to be described later.

4. Fourth Embodiment of Present Technology (Example 4 of Light Source Apparatus)

The number of mirrors of the light-combining/splitting unit 12 can be modified as appropriate. It will be described with reference to FIG. 10. FIG. 10 is a schematic view showing a configuration of a light source apparatus 1 according to an embodiment of the present technology.

As shown in FIG. 10, the light-combining/splitting unit 12 according to the embodiment of the present technology has a mirror 121, a first dichroic mirror 122 that transmits the red light and reflects the green light, and a second dichroic mirror 123 that transmits and reflects light in accordance with a light wavelength.

The light-combining/splitting unit 12 has wavelength dependency. That is, the mirror 121 of the light-combining/splitting unit 12, the first dichroic mirror 122, and/or the second dichroic mirror 123 have wavelength dependency.

This wavelength dependency may be similar to the wavelength dependency of the filter unit 18 in the second embodiment, for example. That is, the light-combining/splitting unit 12 has spectral properties that the amount of light of the blue light emitted to the light-receiving unit 13 is larger than the amount of light of each of the red light and the green light.

Accordingly, the number of components is further reduced. Therefore, the present technology can contribute to reduction in size and manufacturing cost of the apparatus, for example. It should be noted that the light source apparatus 1 according to the present embodiment may include the filter unit 18 as in the second embodiment.

An example of the design of the present embodiment will be described with reference to FIG. 11. FIG. 11 is a table showing an example of the design according to the embodiment of the present technology.

As shown in FIG. 11, the ratio of the amounts of light of the red light, the green light, and the blue light respectively emitted by the plurality of light source units (11R, 11G, 11B) is 300:200:100.

The mirror 121 of the light-combining/splitting unit 12 is disposed on the optical path of the red light emitted from the red light source unit 11R and reflects 56% of the red light.

The first dichroic mirror 122 of the light-combining/splitting unit 12 is disposed on the optical path of the red light emitted from the mirror 121 and on the optical path of the green light emitted from the green light source unit 11G. The first dichroic mirror 122 transmits 100% of the red light and reflects 63% of the green light. Accordingly, the red light and the green light are combined.

The second dichroic mirror 123 of the light-combining/splitting unit 12 is disposed on the optical paths of the red light and the green light emitted from the first dichroic mirror 122 and on the optical path of the blue light emitted from the blue light source unit 11B. The second dichroic mirror 123 transmits 90% of the red light made incident thereon and reflects 10% of the red light made incident thereon. The second dichroic mirror 123 transmits 80% of the green light made incident thereon and reflects 20% of the green light made incident thereon. The second dichroic mirror 123 transmits 50% of the blue light made incident thereon and reflects 50% of the blue light made incident thereon. Accordingly, the second dichroic mirror 123 can split incident light into the first optical path toward the light-receiving unit 13 and the second optical path toward the outside (eyes of the user) of the light source apparatus 1.

In a case where the light source unit (11R, 11G, 11B) and the light-combining/splitting unit 12 are designed as described above, the ratio of the amounts of light of the red light, the green light, and the blue light included in the second optical path emitted from the light-combining/splitting unit 12 is 150:100:50. On the other hand, the ratio of the amounts of light of the red light, the green light, and the blue light included in the first optical path emitted from the light-combining/splitting unit 12 is 17:25:50. At this time, the ratio of the voltage output from the light-receiving unit 13 when receiving the red light, the green light, and the blue light is 50:50:50. The voltage values output in accordance with the red light, the green light, and the blue light are substantially identical.

5. Fifth Embodiment of Present Technology (Example 5 of Light Source Apparatus)

Figure 12:
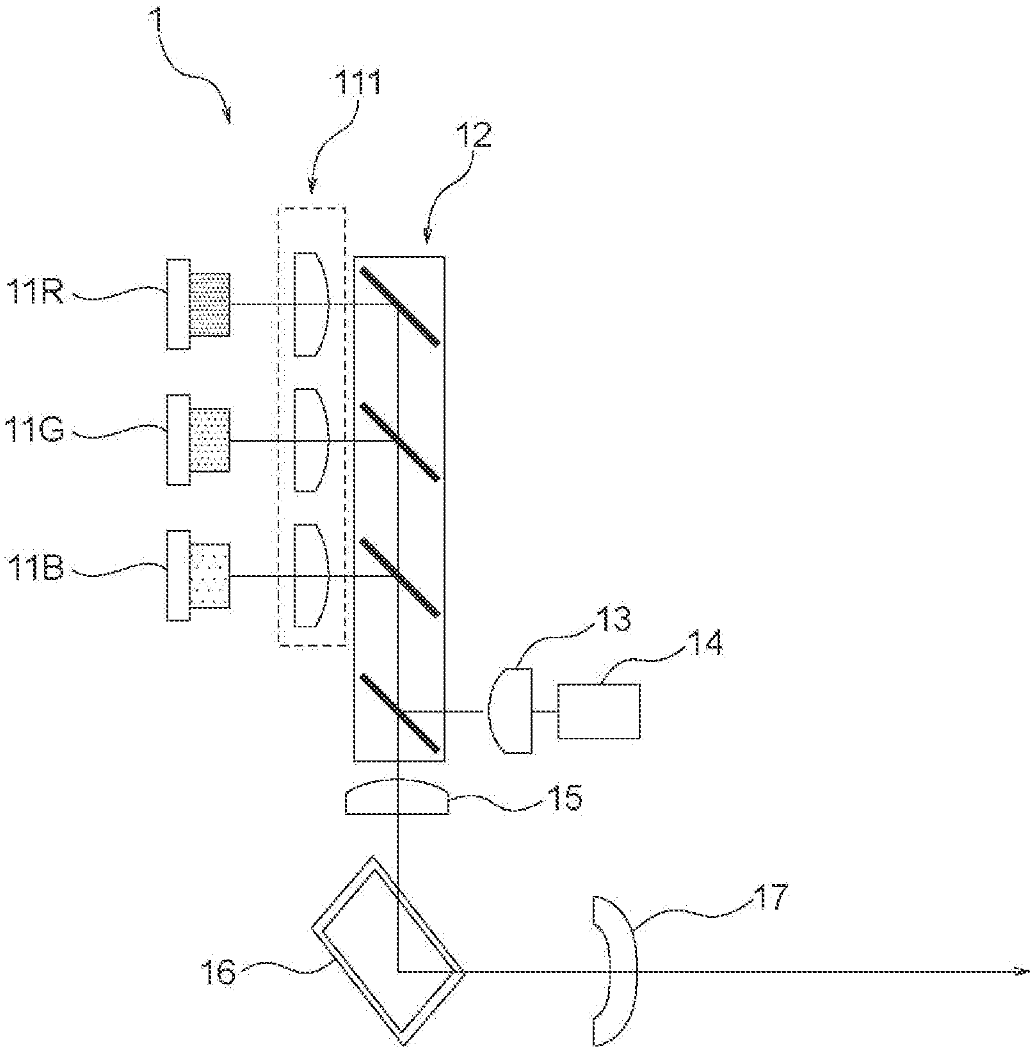
FIG. 12 A schematic view showing a configuration of the light source apparatus 1 according to the embodiment of the present technology.

A light-combining/splitting unit according to an embodiment of the present technology may include a dichroic prism. It will be described with reference to FIG. 12. FIG. 12 is a schematic view showing a configuration of a light source apparatus 1 according to the embodiment of the present technology.

As shown in FIG. 12, the light-combining/splitting unit 12 according to the embodiment of the present technology has a dichroic prism. The dichroic prism has wavelength dependency. This wavelength dependency may be similar to the wavelength dependency of the light-combining/splitting unit 12 according to the third embodiment, for example.

During the manufacture of the dichroic prism, the plurality of mirrors is integrated and manufactured as a dichroic prism after the angle of each of the plurality of mirrors is adjusted. Therefore, the manufacture is facilitated.

Moreover, there is a possibility that the optical paths in the respective colors may separately change due to a change over time, a temperature change, or the like because mirrors according to other embodiments are adhered with an adhesion, for example. On the other hand, in the present embodiment, the optical paths in the respective colors change in conjunction with each other because the plurality of mirrors is integrally formed. As a result, for example, bad effects on detection of the light-receiving unit 13 can be reduced.

6. Sixth Embodiment of Present Technology (Example 6 of Light Source Apparatus)

A light source apparatus according to an embodiment of the present technology may have wavelength dependency with respect to light on an optical path toward a light-receiving unit 13 and may have wavelength dependency with respect to light on an optical path toward the outside of the light source apparatus. Although the light source apparatus according to the other embodiment described above has wavelength dependency with respect to the light on the optical path toward the light-receiving unit 13, the light source apparatus according to the sixth embodiment has wavelength dependency with respect to the light on the optical path toward the outside of the light source apparatus.

The sixth embodiment has a configuration contrast to that of the second embodiment. However, the contrast configuration is not limited to the second embodiment. The sixth embodiment may have a configuration contrast to that of each of third to fifth embodiments.

Figure 13:
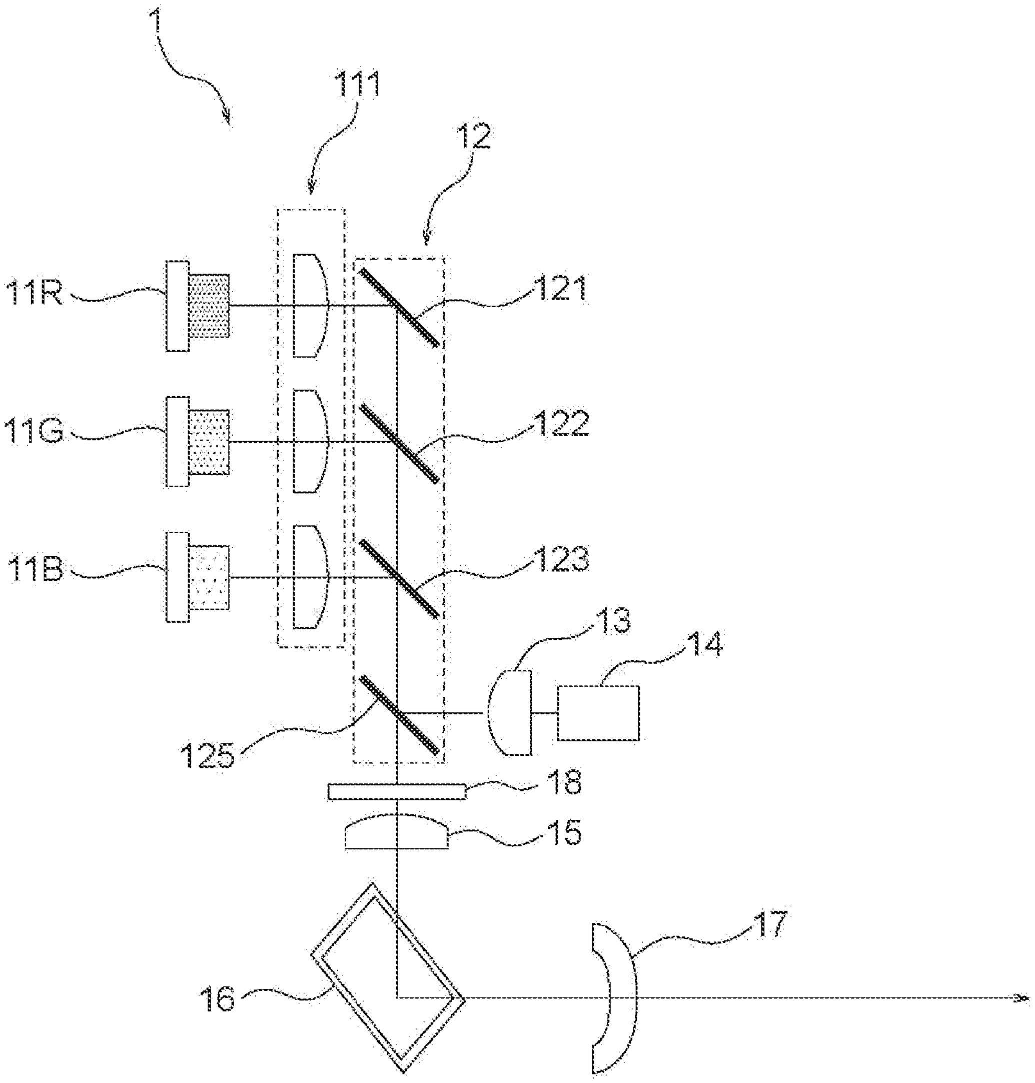
FIG. 13 A schematic view showing a configuration of the light source apparatus 1 according to the embodiment of the present technology.

A light source apparatus according to the sixth embodiment of the present technology will be described with reference to FIG. 13. FIG. 13 is a schematic view showing a configuration of a light source apparatus 1 according to the embodiment of the present technology.

As shown in FIG. 13, a filter unit 18 according to the embodiment of the present technology is disposed on an optical path of light emitted from a light-combining/splitting unit 12 and has wavelength dependency. In the present embodiment, the filter unit 18 is disposed on an optical path emitted from the light-combining/splitting unit 12 toward the outside of the light source apparatus 1. For example, the filter unit 18 may have spectral properties that the amount of light of the blue light emitted to the light-receiving unit 13 is smaller than an amount of light of each of the red light and the green light. For example, a filter having transmittance different depending on a wavelength can be used as the filter unit 18.

An example of the design of the present embodiment will be described with reference to FIG. 14. FIG. 14 is a table showing an example of the design according to the embodiment of the present technology. As shown in FIG. 14, the ratio of the amounts of light of the red light, the green light, and the blue light respectively emitted by the plurality of light source units (11R, 11G, 11B) is 166.7:250:500.

The transmittance and/or reflectance of the mirror 121, the first dichroic mirror 122, and the second dichroic mirror 123 of the light-combining/splitting unit 12 is similar to that of the second embodiment.

The half mirror 125 of the light-combining/splitting unit 12 is disposed on the optical path of the light emitted from the second dichroic mirror 123 and transmits 90% of incident light and reflects 10% of incident light. This enables the half mirror 125 to split incident light into the first optical path toward the light-receiving unit 13 and the second optical path toward the outside (eyes of the user) of the light source apparatus 1.

The filter unit 18 transmits 100% of the red light made incident thereon, transmits 44.4% of the green light made incident thereon, and transmits 11.1% of the blue light made incident thereon. The amount of light of the blue light emitted to the light-receiving unit 13 is smaller than the amount of light of each of the red light and the green light. Accordingly, the ratio of the amounts of light of the red light, the green light, and the blue light included in the second optical path emitted from the light-combining/splitting unit 12 is 150:100:50.

With such design, the balance among the amounts of light of the red light, the green light, and the blue light is suitably adjusted and the light source apparatus 1 can provide a high-quality video to the user.

On the other hand, the ratio of the amounts of light of the red light, the green light, and the blue light included in the first optical path emitted from the light-combining/splitting unit 12 and received by the light-receiving unit 13 is 16.7:25:50. When the ratio of the sensitivity of the red light, the green light, and the blue light that the light-receiving unit 13 is 3:2:1, the ratio of the voltage output from the light-receiving unit 13 when receiving the red light, the green light, and the blue light is 50:50:50. The voltage values output in accordance with the red light, the green light, and the blue light are substantially identical.

In accordance with the present technology, a hazard to human bodies and, in particular, a high abnormality of the blue light can be detected earlier.

7. Seventh Embodiment of Present Technology (Image Display Apparatus)

An image display apparatus according to the embodiment of the present technology will be described with reference to FIG. 15. FIG. 15 is a schematic view showing a configuration of an image display apparatus 10 according to the embodiment of the present technology. As shown in FIG. 15, the image display apparatus 10 according to the present embodiment includes the above-mentioned light source apparatus 1 and an objective optical unit 2 that receives light emitted from the light source apparatus 1 and emits light to the retinas of the user.

The objective optical unit 2 can be mounted on the head of a user 3. An embodiment of the objective optical unit 2 may be, for example, eyeglasses, goggles, or a helmet.

The objective optical unit 2 is separated from the light source apparatus 1. An optical element of the objective optical unit 2 is disposed on an optical path of video light 4 and is disposed in front of the eyes of the user 3. The video light 4 projected from the light source apparatus 1 passes through such an optical element and reaches the eyes of the user 3. The video light 4 passes through the pupils of the user 3 and forms an image on the retinas. Accordingly, a virtual image 5 seems to float up in a space.

The above-mentioned optical element may include a diffraction grating that diffracts the video light 4 projected from the light source apparatus 1. The diffraction grating diffracts video light projected from the light source apparatus 1 and is used for reaching the eyes of the user 3. For example, a hologram lens, favorably a film-like hologram lens, and more favorably a transparent film-like hologram lens can be employed as the above optical element. Desired optical properties can be applied to a hologram lens by known techniques in the prior art. A commercially available hologram lens may be used as the hologram lens or the hologram lens may be manufactured by known techniques in the prior art.

The hologram lens can be stacked as the above-mentioned optical element on for example one of surfaces of the lens of the objective optical unit 2. This surface may be a surface on an external landscape side or may be a surface on an eyeball side. The image display apparatus 10 according to the present technology can be used in such a manner that the above-mentioned optical element is attached to the objective optical unit 2 selected as appropriate by the user or those skilled in the art. Therefore, a significantly wide range of options for the objective optical unit 2 that can be employed in the present technology can be provided.

It should be noted that the above-mentioned optical element only needs to diffract the video light. Therefore, for example, a generally-used convex lens may be used as the above-mentioned optical element.

The objective optical unit 2 does not need to include the projection optical system. In addition, the objective optical unit 2 does not need to include components required for projecting the video light, e.g., the above-mentioned projection optical system, a power supply, and an electrically driven apparatus. Accordingly, reduction in size and/or weight of the objective optical unit 2 can be achieved. As a result, the burden on the user is reduced.

Moreover, the components required for projecting the video light do not need to be provided. Therefore, the manufacturing cost for the objective optical unit 2 can be reduced, and the degree of freedom of design for the objective optical unit 2 can be increased.

It should be noted that the image display apparatus according to the present technology does not need to employ an embodiment in which the light source apparatus 1 and the objective optical unit 2 are separated from each other like the present embodiment. The image display apparatus according to the present technology may employ an embodiment in which the light source apparatus 1 and the objective optical unit 2 are integrated with each other like a head-mounted display, for example.

In addition, the configurations described in the above embodiments may be employed and/or omitted and/or may be changed into other configurations as appropriate without departing from the gist of the present technology.

It should be noted that the effects described in the present specification are merely exemplary and not limitative and other effects may be provided.

It should be noted that the present technology can also take the following configurations.

[1] A light source apparatus, including:

a plurality of light source units that respectively emits light in respective colors;

a light-combining/splitting unit that combines/splits light emitted from each of the plurality of light source units;

at least one light-receiving unit that receives light emitted from the light-combining/splitting unit; and a control unit that switches activation and deactivation of each of the plurality of light source units, in which the control unit stops each of the plurality of light source units on the basis of light received by the light-receiving unit.

[2] The light source apparatus according to [1], further including a filter unit that is disposed on an optical path of light emitted from the light-combining/splitting unit and has wavelength dependency.

[3] The light source apparatus according to [2], in which the filter unit is disposed on an optical path of light received by the light-receiving unit.

[4] The light source apparatus according to [3], in which the filter unit has spectral properties that an amount of light of blue light emitted to the light-receiving unit is larger than an amount of light of each of red light and green light.

[5] The light source apparatus according to [2], in which the filter unit is disposed on an optical path toward outside of the light source apparatus.

[6] The light source apparatus according to [5], in which the filter unit has spectral properties that an amount of light of blue light emitted is smaller than an amount of light of each of red light and green light.

[7] The light source apparatus according to any one of [1] to [6], in which the light-combining/splitting unit has wavelength dependency.

[8] The light source apparatus according to any one of [1] to [7], in which the light-combining/splitting unit has spectral properties that an amount of light of blue light emitted to the light-receiving unit is larger than an amount of light of each of red light and green light.

[9] The light source apparatus according to any one of [1] to [8], in which the light-combining/splitting unit receives laser light.

The light source apparatus according to any one of [1] to [9], in which the light-combining/splitting unit has an optical waveguide.

[11] The light source apparatus according to any one of [1] to [10], in which the light-combining/splitting unit has a dichroic mirror.

[12] The light source apparatus according to any one of [1] to [11], in which the light-combining/splitting unit has a dichroic prism.

[13] The light source apparatus according to any one of [1] to [10], in which the light-receiving unit has a silicon photodiode.

[14] The light source apparatus according to any one of [1] to [13], in which the control unit has a comparator that compares a signal value of an analog signal based on an amount of light of light received by the light-receiving unit with a threshold value.

[15] The light source apparatus according to [14], in which the threshold value is lower than a signal value of an analog signal based on an amount of light that is an accessible emission limit.

[16] The light source apparatus according to any one of [1] to [15], in which light on an optical path toward outside of the light source apparatus out of a plurality of optical paths emitted from the light-combining/splitting unit is projected onto a retina of a user.

[17] An image display apparatus, including:

the light source apparatus according to any one of [1] to [16]; and an objective optical unit that receives light emitted from the light source apparatus and emits the light to a retina of a user.

[18] The image display apparatus according to [17], in which the light source apparatus and the objective optical unit are separated from each other.

REFERENCE SIGNS LIST

1 light source apparatus
11R red light source unit
11G green light source unit
11B blue light source unit
111 coupling lens
12 light-combining/splitting unit
121 mirror
122 first dichroic mirror
123 second dichroic mirror
124 third dichroic mirror
125 half mirror
13 light-receiving unit
14 control unit
141 comparator
142 logic gate
143 storage unit
144 voltage converting unit
145 retaining unit
146 light source control unit
15 condenser lens
16 light scanning unit
17 projection lens
18 filter unit
2 objective optical unit
3 user
4 video light
5 virtual image
10 image display apparatus

What is claimed is:

1. A light source apparatus, comprising:

a plurality of light source units that respectively emits light in respective colors;

a light-combining/splitting unit that combines/splits light emitted from each of the plurality of light source units;

at least one light-receiving unit that receives light emitted from the light- combining/splitting unit;

a control unit that switches activation and deactivation of each of the plurality of light source units, wherein the control unit stops each of the plurality of light source units on a basis of light received by the light-receiving unit; and a filter unit that is disposed on an optical path of light emitted from the light-combining/splitting unit and has wavelength dependency.

2. The light source apparatus according to claim 1, wherein the filter unit is disposed on an optical path of light received by the light-receiving unit.

3. The light source apparatus according to claim 2, wherein the filter unit has spectral properties that an amount of light of blue light emitted is larger than an amount of light of each of red light and green light.

4. The light source apparatus according to claim 1, wherein the filter unit is disposed on an optical path toward outside of the light source apparatus.

5. The light source apparatus according to claim 4, wherein the filter unit has spectral properties that an amount of light of blue light emitted is smaller than an amount of light of each of red light and green light.

6. The light source apparatus according to claim 1, wherein the light-combining/splitting unit has wavelength dependency.

7. The light source apparatus according to claim 1, wherein the light-combining/splitting unit receives laser light.

8. The light source apparatus according to claim 1, wherein the light-combining/splitting unit has an optical waveguide.

9. The light source apparatus according to claim 1, wherein the light-combining/splitting unit has a dichroic mirror.

10. The light source apparatus according to claim 1, wherein the light-combining/splitting unit has a dichroic prism.

11. The light source apparatus according to claim 1, wherein the light-receiving unit has a silicon photodiode.

12. The light source apparatus according to claim 1, wherein the control unit has a comparator that compares a signal value of an analog signal based on an amount of light of light received by the light-receiving unit with a threshold value.

13. The light source apparatus according to claim 12, wherein the threshold value is lower than a signal value of an analog signal based on an amount of light that is an accessible emission limit.

14. The light source apparatus according to claim 1, wherein light on an optical path toward outside of the light source apparatus out of a plurality of optical paths emitted from the light-combining/splitting unit is projected onto a retina of a user.

15. An image display apparatus, comprising:

the light source apparatus according to claim 1; and an objective optical unit that receives light emitted from the light source apparatus and emits the light to a retina of a user.

16. The image display apparatus according to claim 15, wherein the light source apparatus and the objective optical unit are separated from each other.

17. A light source apparatus, comprising:

a plurality of light source units that respectively emits light in respective colors;

a light-combining/splitting unit that combines/splits light emitted from each of the plurality of light source units;

at least one light-receiving unit that receives light emitted from the light-combining/splitting unit; and a control unit that switches activation and deactivation of each of the plurality of light source units, wherein the control unit stops each of the plurality of light source units on a basis of light received by the light-receiving unit, and wherein-the light-combining/splitting unit has spectral properties that an amount of light of blue light emitted to the light-receiving unit is larger than an amount of light of each of red light and green light.

18. The light source apparatus according to claim 17, wherein the light-combining/splitting unit receives laser light.

19. The light source apparatus according to claim 17, wherein the light-combining/splitting unit has an optical waveguide.

20. The light source apparatus according to claim 17, wherein the light-combining/splitting unit has a dichroic mirror.

* * * * *